(12) United States Patent
Pailles et al.

(10) Patent No.: US 7,721,108 B2
(45) Date of Patent: May 18, 2010

(54) METHOD AND SYSTEM FOR CHECKING DIGITAL SIGNATURES AND CARD WITH MICROCIRCUIT FOR USING THE METHOD

(75) Inventors: Jean-Claude Pailles, Epron (FR); Vincent Boutroux, Hermanville sur Mer (FR)

(73) Assignee: France Telecom, Paris (FR)

( * ) Notice: Subject to any disclaimer, the term of this patent is extended or adjusted under 35 U.S.C. 154(b) by 999 days.

(21) Appl. No.: 10/516,966

(22) PCT Filed: May 21, 2003

(86) PCT No.: PCT/FR03/01535

§ 371 (c)(1), (2), (4) Date: Jul. 29, 2005

(87) PCT Pub. No.: WO03/105399

PCT Pub. Date: Dec. 18, 2003

(65) Prior Publication Data

US 2006/0168447 A1   Jul. 27, 2006

(30) Foreign Application Priority Data

Jun. 5, 2002 (FR) .................................. 02 06915

(51) Int. Cl.
*G06F 21/00* (2006.01)

(52) U.S. Cl. ..................... 713/185; 713/155; 713/156; 713/170; 713/175; 713/176; 713/178; 713/181; 713/183; 713/187; 713/190; 713/194; 726/19; 726/21; 726/24

(58) Field of Classification Search ................. 713/185
See application file for complete search history.

(56) References Cited

U.S. PATENT DOCUMENTS 6,076,162 A * 6/2000 Deindl et al. ............... 713/159

(Continued)

FOREIGN PATENT DOCUMENTS

EP   0 856 821   8/1998

(Continued)

OTHER PUBLICATIONS

Notice of Reasons for Refusal in JP Application 2004-512341 mailed Nov. 10, 2009, 6 pages (English translation).

(Continued)

*Primary Examiner*—William R Korzuch
*Assistant Examiner*—Bryan Wright
(74) *Attorney, Agent, or Firm*—Fish & Richardson P.C.

(57) ABSTRACT

To check a digital signature, using a microcircuit card, the microcircuit being designed to receive and to process requests to check digital signatures, the process comprises storing in a memory in the microcircuit a certificates table containing digest forms of authorized public keys, and a phase of checking a digital signature consisting of: receiving by the microcircuit the digital signature to be checked and a public key corresponding to a private key that was used to generate the digital signature to be checked; calculating a digest form of the received public key, searching for the calculated digest form of the public key in the certificates table, and decrypting the digital signature using the received public key if the calculated digest form of the public key is located in the certificates table.

22 Claims, 3 Drawing Sheets

U.S. PATENT DOCUMENTS 6,215,872 B1 4/2001 Van Oorschot
2004/0215964 A1* 10/2004 Barlow et al. ............... 713/172

FOREIGN PATENT DOCUMENTS

JP 11205308 A 7/1999
WO WO01/52470 7/2001

OTHER PUBLICATIONS

Sakakibara, Verification of Public Key Certificates, Information Processing Society of Japan, 1998, Research Report, IPSJ SIG Notes, 98(54):53-58 (English translation).

* cited by examiner

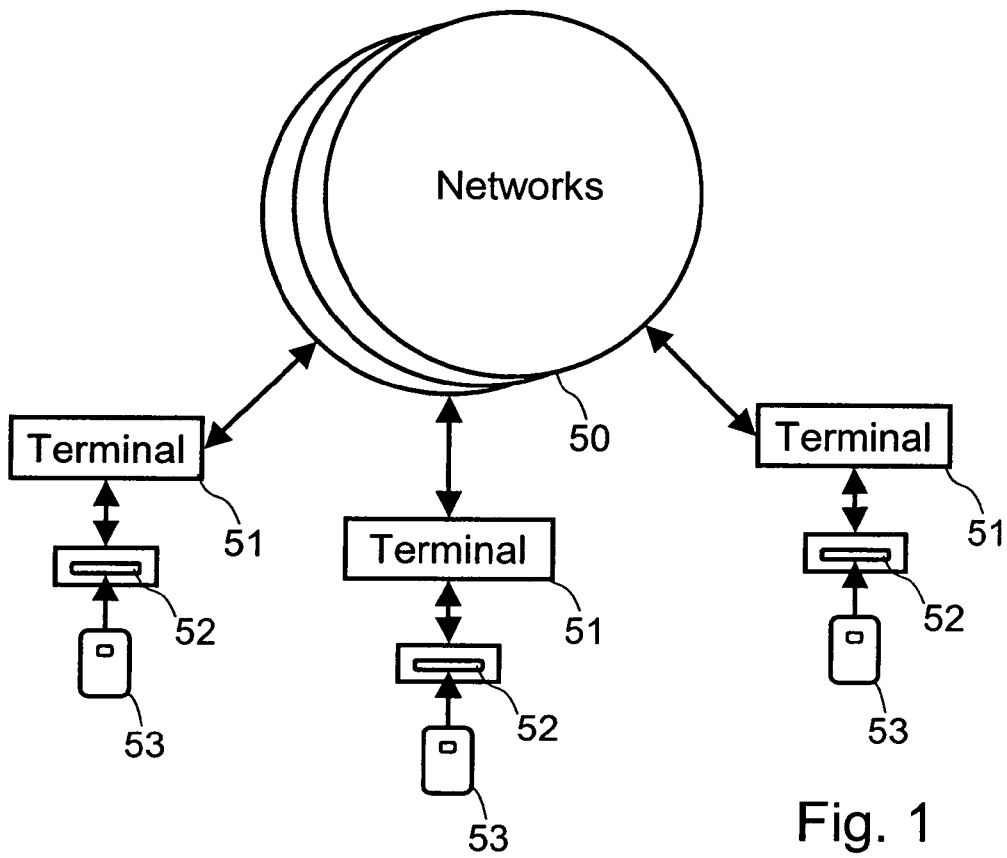
Fig. 1
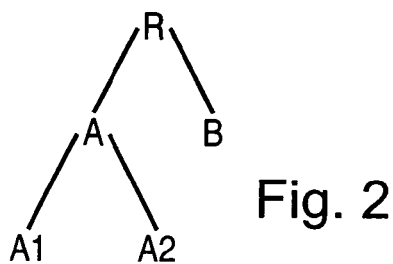
Fig. 2
Fig. 3 ic microcircuit, for example in electronic transport ticket,
METHOD AND SYSTEM FOR CHECKING DIGITAL SIGNATURES AND CARD WITH MICROCIRCUIT FOR USING THE METHOD

BACKGROUND

This invention relates to a method and system for checking digital signatures and a smart card for using this method.

In particular, but not exclusively, it is applicable to authentication of information and verification of digital signatures in order to authorize specific processing. This processing consists particularly of recording rights in a card with an electronic microcircuit, for example in electronic transport ticket, or electronic purse or reduction voucher distribution applications.

Cards with electronic microcircuits, called smart cards, are usually used as a mobile computer support for a wide variety of applications mostly requiring a high degree of security, and particularly bank operations, secure payments, access to buildings or secure areas and telecommunications.

For example, when it is required to update sensitive data in a smart card, such as a refill amount for an electronic purse application, the card must be capable of checking the source of an update order that it receives. This is done by associating the update order with a digital signature, in which the identity of the signatory is guaranteed by a certificate that is also associated with the update order.

A digital signature added to a message is usually obtained by applying a hashing function to the message to obtain a digest, and encrypting this digest using a private key known only to the signatory. Therefore, all that is necessary to check a signature is to have the public key corresponding to the private key used, and the hashing function, to apply the hashing function to the message, to decrypt the signature using the public key and to compare the result obtained using the hashing function with the result obtained by decryption. If these two results are identical, the signature is correct.

A public key certificate, for example conforming with the X509 or PKCS#6 standard, is composed of a combination of a public key used by a person, identification information for this person and a definition of a validity period, the combination of this information being made impossible to falsify by a digital signature added by a certification authority, this signature using a private key of the certification authority. All that is necessary to check this certificate is to have the public key of the certification authority corresponding to the private key used, and to use this public key to check that the digital signature really is issued by the certification authority. It is thus possible to make sure that a public key corresponds to the identity of a determined person. However, this principle does not guarantee that the person who is using the private key corresponding to the public key is actually the person identified in the certificate. Certification authorities usually do not guarantee this correspondence.

To guarantee such correspondence, it has been proposed to set up a chain or pyramid organization based on the "certificates chains" concept in which the digital signature of each person is certified by the signature of an entity that was previously certified by another entity and so on, until reaching a reference authority located at the top of the pyramid. In such an organization, a signature is based on all certificates of all public keys in order to work upwards along the certification chain as far as the reference authority. Therefore to check a signature, all certificates have to be checked until reaching a certificate issued by a known entity in the certification chain. It is also necessary that the public key of this known entity should be stored reliably and so that it cannot be falsified.

The techniques that have to be used to manage such an organization can easily be installed in a PC type personal computer, particularly using Internet browsing software that integrates all or some of these functions with the SSL (Secure Sockets Layer) and HTTPS (Hypertext Transfer Protocol integrating SSL) protocols. However, these techniques are much more difficult to use in a smart card that has a significantly more limited calculation power and storage capacity. Certificates chains that have to be processed are very long compared with the usual characteristics of smart cards. Thus, a certificate conforming with the X509 standard may be several kbits long, and if the certificates chain is long, the card must be able to process and memories more information than is possible based on its capacities.

In this respect, it is important to emphasize that the terminal to which the card is connected cannot execute such a processing, and the terminal memory cannot be used for this processing, without affecting security since it would then be very easy to deceive the card, particularly by replacing one public key by another.

It has already been proposed to introduce all public keys of certification authorities in the certification chain, into the memory of the smart card. However this solution requires large memory capacities considering that the public key frequently occupies more than one kbit. It is also necessary that these public keys should be stored in a secure memory area to prevent risks of fraud consisting of introducing an unauthorized key into this list of public keys. At the moment, microcircuits installed in the smart cards do not have sufficient secure memory capacity.

SUMMARY

The purpose of this invention is to eliminate these disadvantages by proposing a data and processing organization between a smart card and a terminal in order to minimize constraints applied to the card in terms of necessary quantity of memory and processing, without affecting the security of the system in which they are used. This objective is achieved by providing a process for verification of a digital signature, involving a microcircuit that can be connected to a data processing system, the microcircuit being designed to receive requests to check digital signatures from the data processing system, and to process these requests, a digital signature being generated using a private key only known to a signatory entity and associated with a public key.

According to the invention, this process includes a step of storing in a memory in the microcircuit a certificates table containing a digest form of at least one public key, and a phase of checking a digital signature comprising steps consisting of:

receiving by the microcircuit the digital signature to be checked and a public key in a pair of keys comprising a private key used to generate the digital signature to be checked, calculating a digest form of the received public key and searching for the calculated digest form of the public key in the certificates table, and decrypting the digital signature using the received public key if the calculated digest form of the public key is located in the certificates table.

According to one particular feature of the invention, this process comprises a phase of inserting a public key in the certificates table, comprising steps consisting of:

receiving by the microcircuit a certificate of the public key to be inserted in the certificates table, and a public key from a certification entity that generated the certificate, the certificate comprising the public key to be added into the certificates table and a digital signature of the certification entity, generated using a private key belonging to a pair of keys including the public key of the certification entity, calculating by the microcircuit a digest form of the public key received from the certification entity, and searching for the calculated digest form of the public key in the certificates table, decrypting the digital signature using the public key received from the certification entity if the calculated digest form of the public key is located in the table, extracting the public key to be inserted from the certificate if the decrypted digital signature is correct, calculating a digest of the public key extracted from the certificate, and inserting the calculated digest in the certificates table.

Advantageously, the phase of insertion in the certificates table of a public key in the certificates table includes the insertion of a pointer to the digest of the public key of the certification entity that issued the certificate of the public key to be inserted, so as to define a certification tree in combination with the inserted digest of the public key.

According to another feature of the invention, this process includes a phase of deleting a public key digest from the certificates table consisting of deleting the digest of a public key to be removed, from the certificates table, and deleting from the certificates table all digests of public keys associated with a pointer indicating the public key to be removed.

Preferably, each public key digest entered into the certificates table is associated with a validity end date, and the phase of inserting a public key into the certificates table also comprises steps consisting of reading a validity end date of the public key to be inserted in the received certificate, and entering the validity end date of the public key to be inserted into the certificates table, together with the digest of the public key to be inserted, if it is earlier than the validity end date of the public key of the certification entity read in the certificates table.

Also preferably, each digest of a public key entered into the certificates table is associated with a usage counter that is incremented every time that a digital signature is checked using the public key, and said process including deletion of a public key digest from the certificates table when the usage counter is zero and the number of empty locations in the certificates table is less than a predetermined threshold.

Also preferably, each public key digest entered into the certificates table is associated with a usage counter that is incremented every time that a digital signature is checked using the public key, on a last usage date that is updated every time that the associated usage counter is incremented, and when the number of empty locations in the certificates table is less than a predetermined threshold, said process also includes a step to select a digest of a public key to be deleted as a function of the corresponding associated values of the usage counter and the last usage date.

Advantageously, the microcircuit uses a predefined hashing function to calculate the digest forms of the public keys.

According to yet another particular feature of the invention, this process comprises a phase of inserting a root public key in the certificates table, this insertion phase being done by write processing controlled by a MAC calculated using a specific key in the microcircuit and only known to an entity having issued the microcircuit.

Advantageously, the digest of a public key memorized in the certificates table is obtained by calculating a digest of the public key associated with other information such as the validity end date of the public key, identity information and serial numbers, this information being transmitted to the microcircuit every time that the signature is checked using the public key.

Advantageously, the digest of a public key memorized in the certificates table is obtained by calculating a digest of the certificate received by the microcircuit when the public key is inserted in the certificates table, this certificate being transmitted to the microcircuit every time that the signature is checked using the public key.

Preferably, the certificates table is stored in a secure memory area in the microcircuit.

The invention also relates to a microcircuit card using the process defined above.

The invention also relates to a system for checking a digital signature including a microcircuit that can be connected to a data processing system, for implementation of the process defined above.

BRIEF DESCRIPTION OF THE DRAWINGS

A preferred embodiment of the invention will be described below as a non-limitative example with reference to the attached drawings among which:

FIG. 1 diagrammatically shows a system in which the method according to the invention can be used;

FIG. 2 shows a certificates tree;

FIG. 3 shows a certificates tree as it is memorized in a smart card according to the invention;

DETAILED DESCRIPTION

Figures 4, 5:
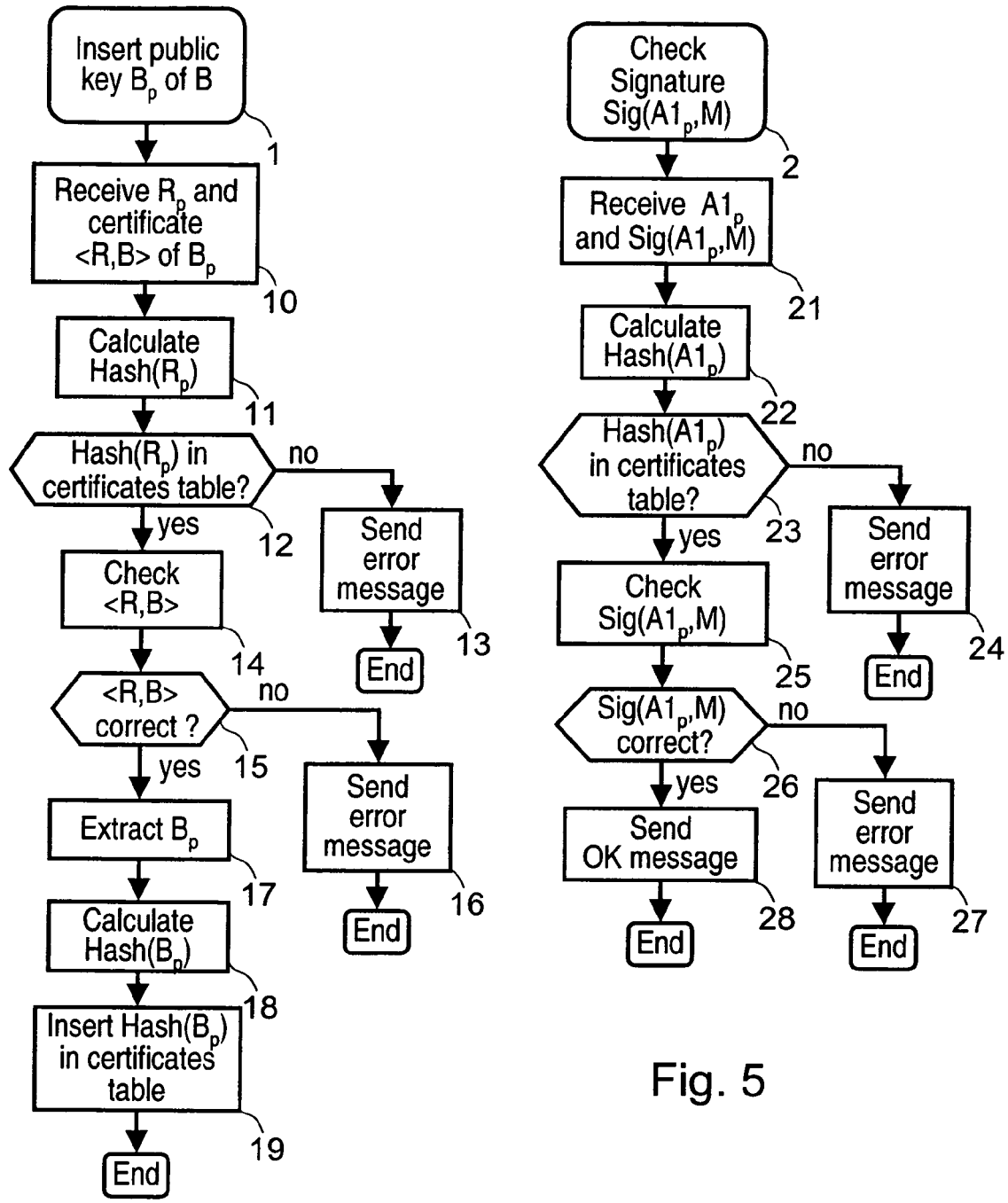
FIGS. 4 to 6 represent the various procedures that will be executed by a smart card according to the invention, in the form of a flowchart.

The system shown in FIG. 1 comprises a plurality of terminals 51 connected to digital data transmission networks 50. These terminals are designed to supply different services that have to be protected against fraud, such as refills of electronic purses, or assignment of a right (for example a transport ticket), or for a secure data exchange.

System users also have a personal card, of the type with a microprocessor 53, more usually called a smart card, each terminal 51 being provided with communication means 52 such as a smart card reader, to communicate with the microprocessor of the card 53.

Before a user can access a service as mentioned above, he must have a smart card 53 in which there will be a public key assigned to the service, in the card memory. This public key will enable him to check or authenticate signatures of different terminals using a certification system.

FIG. 2 represents a public key certificates tree comprising several certification systems. This tree shows that the corresponding public keys of entities A1 and A2 are certified by an entity A, and that the public keys of entity A and entity B are certified by an entity R called the "root" due to the fact that it is located at the root of the tree, by links between keys.

If it is required that a certificate, for example issued by entity A2 and related to a public key of a person X, should be checked by a person only knowing the certification authority R, then an entire certificates chain has to be transmitted to this person comprising a certificate issued by the certification authority R. If we denote a certificate issued by entity A dealing with the public key of an entity A1 as <A, A1>, then this certification chain is composed of the following certificates:

<A2, X><A, A2><R, A>

Each certificate is composed of the signature of the certification authority attached to the public key to be certified, and associated with identification information of the holder of the public key to be certified and the certification authority, and possibly with validity start and end dates. Therefore, we have <R, A>=(Sig$_R$(A$_p$, Identity of A, Validity start and end dates), Identity of R), where A$_p$ represents the public key of entity A.

In the previous example, if it is required that a signature Sig$_X$(M) issued by the person X and dealing with a message M, can be checked by a person who only knows the certification authority R, then the certificates mentioned above have to be associated with the signature:

Sig$_X$(M)<A, 2, X><A, A2><R, A>

In this way, if the public key R$_p$ is known, the certificate <R, A> provides the public key A$_p$ of entity A. The certificate <A, A2> supplies the public key A2$_p$ of entity A2, and the certificate <A2, X> supplies the public key X$_p$ used to check the signature Sig$_X$(M).

When it is required to check a signature and therefore to assure that a public key is valid, this process involves transmission of a large quantity of information and a large amount of processing, these constraints being incompatible with the storage and processing capacities of a smart card.

To solve this problem, this invention proposes to store a digest of public keys of recognized certification authorities in the smart card memory rather than the public keys themselves, for example a digest obtained using a so-called hashing function, such as MD4 or 5 (Message Digest), SHA (Secure Hash Algorithm) or HMAC (Hashed Message Authentication Code).

These digest keys are stored in the form of a certificates table 5, like that shown in FIG. 3. In the certificates table shown in this Figure, each Hash(X$_p$) digest 6 of the public key is associated with a validity end date 7 of the corresponding certificate, for example defined in the form <month number>/<year on 2 digits>, and a pointer 8 to the line in the table corresponding to the public key on the upstream side of the certification chain.

Thus, for example key A2$_p$, memorized in digest form on the fourth line of the table, is associated with a validity end date equal to December 2002 and is attached to line 2 in the table in which information concerning the public key A$_p$ is located. Therefore in general, pointers appearing in the pointers column 8 in table 5 can be used to reconstitute the certification tree shown in FIG. 2.

Since the root key R$_p$ of the certification tree is not attached to any other key, it is associated with a null pointer in the certification table.

Obviously, the certification table according to the invention can contain several independent certification trees, and therefore several root keys.

Apart from the fact that it reduces the necessary memory resources, the invention also simplifies management of this memory knowing that the key size is variable (it is usually larger for root keys than for other keys) and that a hashing function provides a binary sequence with a constant length regardless of the size of the binary sequence applied at the function input.

According to the invention, this certificates table 5 is associated with a procedure for insertion of a new key certified by a key appearing in the table, a procedure for deletion of a key from the table, and a procedure for checking the signature that used a key in the table, these procedures being stored in the program memory of the smart card 53 and being executable by the card processing unit, under the control of the terminal 51 connected to the card.

A new key is inserted in the certificates table 5 using a procedure 1 illustrated diagrammatically in FIG. 4.

In step 10, this procedure receives the certificate of the public key to be inserted in the table 5, <R, B> in the example shown, associated with the public key R$_p$ of the certification authority that issued the certificate. In the next step 11, this procedure calculates a digest Hash(R$_p$) of the received public key R$_p$ using a previously defined hashing function, and then searches 12 for this key digest, in the certificates table. If this key digest Hash(R$_p$) does not exist in the certificates table 5, this procedure returns 13 an error message in response. However, if it does exist, it checks 14 the certificate by attempting to decrypt it using the public key R$_p$. If the certificate is not valid, in other words if it cannot be decrypted using the public key R$_p$ (step 15), this procedure 16 returns an error message in response. If it is valid, it extracts 17 the public key Bp to be inserted into the certificates table from the certificate <R, B>, and then it calculates 18 a digest Hash(Bp) of this public key using the same hashing function, and inserts 19 the digest of the public key obtained in the certificates table. In step 19, the procedure also inserts the validity end date supplied by certificate <R, B> in table 5, and inserts the address or the line number in the table corresponding to the public key R$_p$ supplied with the certificate <R, B> as input to the procedure, into column 8 of pointers of the certificates table, for example this address or this line number having been memorized in step 12.

During the step to insert the new key Bp in the table, it can be checked in advance that the validity end date of the new key is earlier than the validity end date of the key R$_p$ to which it is attached by the certificate. This measure is intended to satisfy the principle that an authority cannot assign rights wider than the rights that it possesses. If this date is later than the validity end date of the key to which it is attached, the oldest of these two dates can be entered into the table. As a variant, for security reasons it may be decided not to enter the new key in the table and to issue an error message to the terminal.

Therefore procedure 1 that has just been described can be used to insert a key into a table, the key being attached by a certificate to another key for which the digest is already located in the certificates table 5. Therefore the entire security of the certification system used by the certificates table and the procedure for inserting a new key in the table is based on the procedure used to insert a root key in the table. This is why a root key must be inserted using a procedure providing sufficient protection. Consequently, for example, such a procedure may include conventional write processing controlled by a MAC (Message Authentication Code) calculated using a key specific to the card and only known to the issuer of the card.

FIG. 5 diagrammatically illustrates the procedure 2 for checking the signature denoted Sig(A$_p$,M) to indicate that it is attached to the message M and was generated using a private key corresponding to the public key A$_p$.

This procedure receives the signature to be checked as input to step 21, for example Sig(A1$_p$,M), and the public key A1$_p$ corresponding to the private key that was used to generate the signature.

In step 22, this procedure calculates a Hash(A1$_p$) digest of the received key A1$_p$, and in step 23 searches to see if this key digest is located in the certificates table 5. If it is not, the card cannot verify the signature and it returns 24 an error message. If it is, it verifies 25 the signature by attempting to decrypt the digest of message M using the public key $A1_p$. In the following steps 26, 27, 28, it returns a message giving the result of the verification.

Figures 6, 7:
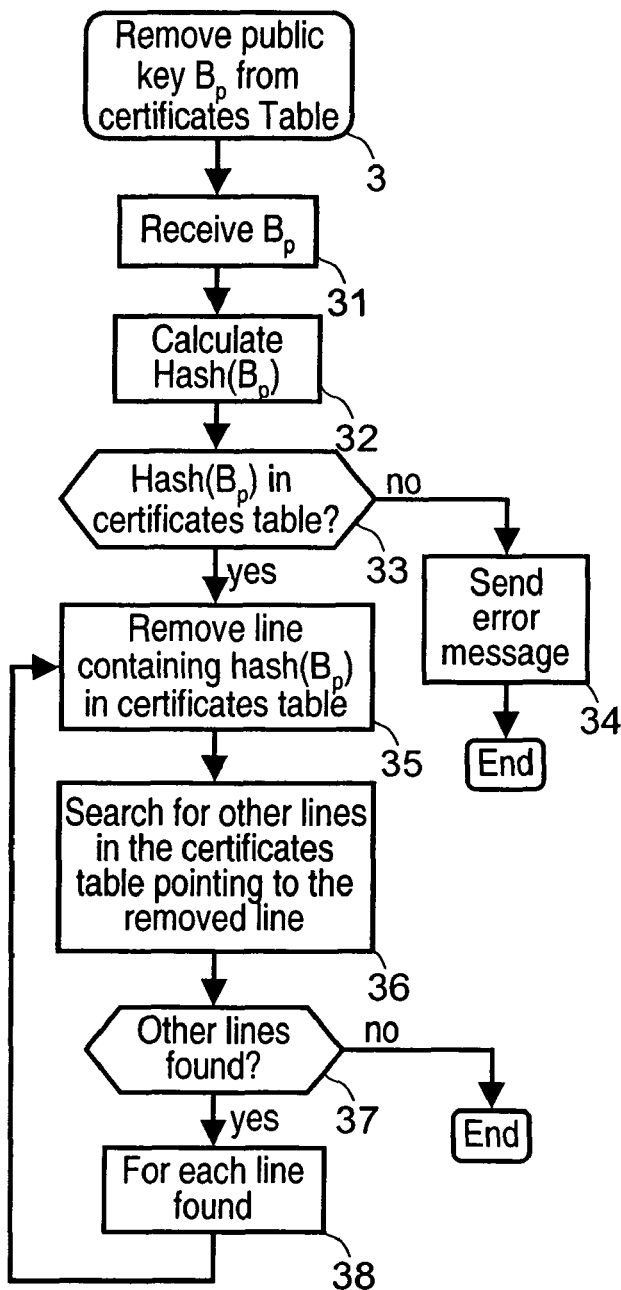
FIG. 7 shows a variant of the certificates table represented in FIG. 3, according to the invention.

FIG. 6 diagrammatically illustrates the procedure 3 for withdrawing a key from the certificates table 5. In step 31, this procedure receives the key $B_p$ to be deleted, as input. In steps 32 and 33, this procedure calculates the Hash($B_p$) digest of the key $B_p$ and searches for the digest of this key in table 5. If the key to be deleted is not found in the table, this procedure returns 34 an error message. If it is, it deletes all information appearing in the line found in table 5. In the next step 36, it searches to see if other keys have to be removed from table 5 because they are attached to the deleted key, in other words if the table contains pointers indicating the deleted line. If other keys have to be deleted (step 37) from the table, this procedure goes on to step 38 to execute the procedure 3 from step 35 for every key found. In this way, if key A is removed from the table, then all keys attached to A are also automatically removed, in other words in FIG. 2, keys A1 and A2 and all keys attached to A1 and A2.

It should be noted that the card processing unit can call procedure 3 regularly, for example when it receives the current date, to remove all expired keys from table 5, in other words all keys that have a validity end date earlier than the current date.

Furthermore, at the end of the deletion processing, table 5 could be reorganized by offsetting all non-empty lines in the table towards the beginning of the table so as to eliminate all empty lines between two non-empty lines.

It should be noted that procedures 1, 2 and 3 that have just been described can be executed in non-connected mode, in other words they do not require action by entities other than the smart card 53 and the terminal 51 to which it is connected, provided that the terminal has the certificates, signatures and public keys required by these procedures.

The certificates table 5' could also include an additional column 41 designed to receive usage counters associated with each key in the table (FIG. 7).

Every time that the procedure 2 is executed to check a signature using a key in the table, the corresponding counter that was initialized to 0 when the key was inserted in the table will be incremented by 1, and all counters associated with keys on the upstream side, in other words between the key corresponding to the checked signature and the root key in the certification chain, and belonging to the same certification chain, will also be incremented by 1. For example, if procedure 2 is called to check a signature using key $A1_p$, then counters associated with the $A1_p$, $A_p$ and $R_p$ keys will be incremented.

This measure means that the limited memory of the smart card 53 can be managed more efficiently by providing information about the use of each key in the certification table so that keys that are never used can be removed from the certification table. This removal may be triggered by the terminal 51. In this case, the procedure 1 comprises a step to send an "insufficient memory" message to the terminal when the number of empty lines in table 5' is less than a predefined number. Procedure 1 could also trigger this removal by calling procedure 3 in step 19.

Furthermore, if all counters in table 5' are not zero and if the table is full, then the key associated with the lowest value of the counter could be deleted. If several keys in table 5' satisfy this criterion, the key chosen to be removed from the table could be one of the keys furthest from a root key.

The table may also contain an additional column 42 containing the update date of each counter or the last usage date of the key. In this way, a criterion about the usage number and a last usage date criterion could be combined, or either of these two criteria could be applied to select the keys to be removed from the certificates table 5'. Depending on the applications, it may be possible to delete the key associated with the oldest last usage date from the table.

The certificates table according to the invention can memorizes other information in digest form, such as identity, serial number, validity end date information, etc. In this case, this information must be transmitted to the card when procedures 1, 2 and 3 are called.

According to one variant of the invention, the table memorizes a digest of certificates issued by the certification authorities and forming the certification tree, rather than a digest of public keys of certification authorities. These certificates then have to be transmitted to the card when procedures 1, 2 and 3 are called.

The invention claimed is:

1. A method for checking a digital signature, involving a microcircuit connectable to a data processing system, the microcircuit being designed to receive requests to check digital signatures from the data processing system, and to process these requests, a digital signature being generated using a private key only known to a signatory entity and associated with a public key, said method comprising:

a step of storing a certificates table containing a digest form of at least one public key in a memory in the microcircuit, wherein the public key is inserted into the certificates table by a step that comprises inserting, in the certificates table, a pointer to the digest form of the public key of the certification entity that issued the certificate of the public key, so as to define a certification tree in combination with the inserted digest form of the public key; and a phase of checking a digital signature comprising steps of:
receiving by the microcircuit a digital signature to be checked and a public key in a pair of keys comprising a private key that was used to generate the digital signature to be checked;
calculating a digest form of the received public key;
searching for the calculated digest form of the public key in the microcircuit's certificates table, at a location at which the inserted pointer points; and
decrypting the digital signature using the received public key if the calculated digest form of the public key is located in the certificates table.

2. The method according to claim 1, further comprising a phase of inserting a public key into the certificates table, comprising steps of: receiving by the microcircuit a certificate of the public key to be inserted in the certificates table, and a public key from a certification entity that generated the certificate, the certificate comprising the public key to be added into the certificates table and a digital signature of the certification entity, generated using a private key belonging to a pair of keys including the public key of the certification entity, calculating by the microcircuit a digest form of the public key received from the certification entity, and searching for the calculated digest form of the public key in the certificates table, decrypting the digital signature using the public key received from the certification entity if the calculated digest form of the public key is located in the table, extracting the public key to be inserted from the certificate if the decrypted digital signature is correct, calculating a digest of the public key extracted from the certificate, and inserting the calculated digest in the certificates table.

3. The method according to claim 2, further comprising a phase of deleting a digest of a public key from the certificates table, comprising steps of deleting from the certificates table the digest of a public key to be removed, and deleting from the certificates table all digests of public keys associated with a pointer indicating the public key to be removed.

4. The method according to claim 2, wherein each public key digest entered into the certificates table is associated with a validity end date, the phase of inserting a public key into the certificates table further comprising steps of reading in a received certificate a validity end date of the public key to be inserted, and entering the validity end date of the public key to be inserted into the certificates table, together with the digest of the public key to be inserted, if it is earlier than the validity end date of the public key of the certification entity read in the certificates table.

5. The method according to claim 2, wherein each digest of a public key entered in the certificates table is associated with a usage counter that is incremented every time that a digital signature is checked using the public key, and said method comprising deletion of a public key digest from the certificates table when the usage counter is zero and the number of empty locations in the certificates table is less than a predetermined threshold.

6. The method according to claim 2, wherein each public key digest entered into the certificates table is associated with a usage counter that is incremented every time that a digital signature is checked using the public key, and with a last usage date that is updated every time that the associated usage counter is incremented, said method further comprising a step to select a digest of a public key to be deleted as a function of the corresponding associated values of the usage counter and the last usage date when the number of empty locations in the certificates table is less than a predetermined threshold.

7. The method according to claim 1, wherein the microcircuit uses a predefined hashing function to calculate the digest forms of the public keys.

8. The method according to claim 1, further comprising a phase of inserting a root public key in the certificates table, this insertion phase being done by a write processing controlled by a MAC calculated using a specific key in the microcircuit and only known to an entity having issued the microcircuit.

9. The method according to claim 1, wherein the digest of a public key memorized in the certificates table is obtained by calculating a digest of the public key associated with other information such as the validity end date of the public key, identity information and serial numbers, this information being transmitted to the microcircuit every time that the signature is checked using the public key.

10. The method according to claim 1, wherein the digest of a public key memorized in the certificates table is obtained by calculating a digest of the certificate received by the microcircuit when the public key is inserted in the certificates table, this certificate being transmitted to the microcircuit every time that the signature is checked using the public key.

11. The method according to claim 1, wherein the certificates table is stored in a secure memory area in the microcircuit.

12. A microcircuit being designed to receive requests to check digital signatures from the data processing system, and to process these requests, a digital signature being generated using a private key only known to a signatory entity and associated with a public key, said microcircuit comprising:

memory means for storing a certificates table containing a digest form of at least one public key, wherein the public key is insertable into the certificates table by means for inserting, in the certificates table, a pointer to the digest form of the public key of the certification entity that issued the certificate of the public key, so as to define a certification tree in combination with the inserted digest form of the public key;

means for receiving a digital signature to be checked and a public key in a pair of keys comprising a private key that was used to generate the digital signature to be checked;

means for calculating a digest firm of the received public key, and for searching for the calculated digest form of the public key in the certificates tables; and means for decrypting the digital signature using the received public key if the calculated digest form of the public key is located in the certificates table.

13. The microcircuit according to claim 12, further comprising:

means for receiving a certificate of the public key to be inserted in the certificates table, and a public key from a certification entity that generated the certificate, the certificate comprising the public key to be added into the certificates table and a digital signature of the certification entity, generated using a private key belonging to a pair of keys including the public key of the certification entity, means for calculating a digest form of the public key received from the certification entity, and for searching for the calculated digest form of the public key in the certificates table, means for decrypting the digital signature using the public key received from the certification entity if the calculated digest form of the public key is located in the table, means for extracting the public key to be inserted from the certificate if the decrypted digital signature is correct, means for calculating a digest of the public key extracted from the certificate, and for inserting the calculated digest in the certificates table.

14. The microcircuit according to claim 13, further comprising means for deleting from the certificates table a digest of a public key to be removed, and means for deleting from the certificates table all digests of public keys associated with a pointer indicating the public key to be removed.

15. The microcircuit according to claim 13, further comprising:

means for reading in a received certificate a validity end date of a public key to be inserted, and means for entering the validity end date of the public key to be inserted into the certificates table, together with the digest of the public key to be inserted, if the validity end date is earlier than the validity end date of the public key of the certification entity read in the certificates table.

16. The microcircuit according to claim 13, further comprising means for incrementing a usage counter associated with each public key digest entered into the certificates table, every time that a digital signature is checked using the public key, and means for deleting a public key digest from the certificates table when the associated usage counter is zero and the number of empty locations in the certificates table is less than a predetermined threshold.

17. The microcircuit according to claim 16, further comprising means for updating a last usage date associated with each public key digest entered into the certificates table, every time that a digital signature is checked using the public key, means for deleting a public key digest from the certificates table when the number of empty locations in the certificates table is less than a predetermined threshold, and means for selecting a digest of a public key to be deleted as a function of the corresponding associated values of the usage counter and the last usage date.

18. The microcircuit according to claim 12, further comprising means for executing a predefined hashing function to calculate the digest forms of the public keys.

19. The microcircuit according to claim 12, further comprising means for inserting a root public key in the certificates table, using a write processing controlled by a MAC calculated using a specific key in the microcircuit and only known to an entity having issued the microcircuit.

20. The microcircuit according to claim 12, wherein the means for calculating the digest of a public key memorized in the certificates table comprise means for calculating a digest of the public key associated with other information comprising the validity end date of the public key, identity information and serial numbers, this information being transmitted to the microcircuit every time that the signature is checked using the public key.

21. The microcircuit according to claim 12, wherein the means for calculating the digest of a public key memorized in the certificates table comprise means for calculating a digest of the certificate received by the microcircuit when the public key is inserted in the certificates table, this certificate being transmitted to the microcircuit every time that the signature is checked using the public key.

22. The microcircuit according to claim 12, wherein the memory means for storing the certificates table is a secure memory area.

* * * * *